(12) United States Patent
Ghosh et al.

(10) Patent No.: US 11,663,489 B2
(45) Date of Patent: May 30, 2023

(54) MACHINE LEARNING SYSTEMS AND METHODS FOR IMPROVED LOCALIZATION OF IMAGE FORGERY

(71) Applicants: Insurance Services Office, Inc., Jersey City, NJ (US); The Regents of the University of Colorado, Denver, CO (US)

(72) Inventors: Aurobrata Ghosh, Pondicherry (IN); Steve Cruz, Colorado Springs, CO (US); Terrance E. Boult, Colorado Springs, CO (US); Maneesh Kumar Singh, Princeton, NJ (US); Venkata Subbarao Veeravarasapu, Munich (DE); Zheng Zhong, Seattle, WA (US)

(73) Assignees: Insurance Services Office, Inc., Jersey City, NJ (US); The Regents of the University of Colorado, Denver, CO (US)

( * ) Notice: Subject to any disclaimer, the term of this patent is extended or adjusted under 35 U.S.C. 154(b) by 41 days.

(21) Appl. No.: 16/911,051

(22) Filed: Jun. 24, 2020

(65) Prior Publication Data
US 2020/0402223 A1 Dec. 24, 2020

Related U.S. Application Data

(60) Provisional application No. 62/865,414, filed on Jun. 24, 2019.

(51) Int. Cl.
*G06N 3/08* (2006.01)
*G06K 9/62* (2022.01)
(Continued)

(52) U.S. Cl.
CPC .......... *G06T 7/0002* (2013.01); *G06F 18/214* (2023.01); *G06N 3/08* (2013.01); *G06N 20/00* (2019.01); *G06T 5/005* (2013.01)

(58) Field of Classification Search
CPC .... G06K 9/6256; G06N 20/00; G06N 3/0454; G06N 3/08; G06N 3/088; G06T 5/005;
(Continued)

(56) References Cited

U.S. PATENT DOCUMENTS

2007/0091926 A1 4/2007 Apostolopoulos et al.
2017/0040016 A1 2/2017 Cui et al.
(Continued)

FOREIGN PATENT DOCUMENTS

WO 2019/032817 A1 2/2019

OTHER PUBLICATIONS

Minyoung Huh , "Fighting Fake News: Image Splice Detection via Learned Self-Consistency", Sep. 2018, Proceedings of the European Conference on Computer Vision (ECCV), 2018, pp. 1-13.*
(Continued)

*Primary Examiner* — Omar S Ismail
(74) *Attorney, Agent, or Firm* — McCarter & English, LLP

(57) ABSTRACT

A system for improved localization of image forgery. The system generates a variational information bottleneck objective function and works with input image patches to implement an encoder-decoder architecture. The encoder-decoder architecture controls an information flow between the input image patches and a representation layer. The system utilizes information bottleneck to learn useful residual noise patterns and ignore semantic content present in each input image patch. The system trains a neural network to learn a representation indicative of a statistical fingerprint of a source camera model from each input image patch while excluding
(Continued)

semantic content thereof. The system can determine a splicing manipulation localization by the trained neural network.

25 Claims, 12 Drawing Sheets

(51) Int. Cl.
  *G06T 7/00* (2017.01)
  *G06N 20/00* (2019.01)
  *G06T 5/00* (2006.01)
  *G06F 18/214* (2023.01)
(58) Field of Classification Search
  CPC ... G06T 7/0002; G06V 10/7557; G06V 10/82
  See application file for complete search history.

(56) References Cited

U.S. PATENT DOCUMENTS

| | | | |
|---|---|---|---|
| 2018/0075343 A1* | 3/2018 | van den Oord | G06N 3/0472 |
| 2018/0173993 A1* | 6/2018 | Cogranne | G06V 10/17 |
| 2018/0268220 A1* | 9/2018 | Lee | G06V 10/26 |
| 2018/0329897 A1* | 11/2018 | Kalchbrenner | G06F 40/58 |
| 2019/0258937 A1* | 8/2019 | Alemi | G06N 3/084 |
| 2019/0371024 A1* | 12/2019 | Wisely Babu | G06V 30/19173 |
| 2020/0265567 A1* | 8/2020 | Hu | G06N 3/0454 |

OTHER PUBLICATIONS

Davide Cozzolino,"A novel framework for image forgery localization," Nov. 27, 2013, Computer Vision and Pattern Recognition,arXiv:1311.6932, pp. 1-4.*
Jason Bunk,"Detection and Localization of Image Forgeries using Resampling Features and Deep Learning," Aug. 24, 2017, 2017 IEEE Conference on Computer Vision and Pattern Recognition Workshops (CVPRW), pp. 1881-1886.*
Sri Kalyan Yarlagadda,"Satellite Image Forgery Detection and Localization Using GAN and One-Class Classifier," Feb. 2018, Society for Imaging Science and Technology, arXiv:1802.04881 ,pp. 214-1-6.*
Edmar R. S. de Rezende,"Detecting Computer Generated Images with Deep Convolutional Neural Networks,"Nov. 7, 2017, 2017 30th SIBGRAPI Conference on Graphics, Patterns and Images (SIBGRAPI), pp. 72-75.*
Abhishek Thakur,"Machine Learning Based Saliency Algorithm For Image Forgery Classification And Localization,"May 2, 2019, 2018 First International Conference on Secure Cyber Computing and Communication (ICSCCC), pp. 451-455.*
Lukas et al., "Detecting Digital Image Forgeries Using Sensor Pattern Noise," Feb. 16, 2006, Proceedings of SPIE—The International Society for Optical Engineering (2006), pp. 4-9.*
Mo Chen, et al., "Determining Image Origin and Integrity Using Sensor Noise," Feb. 12, 2008, IEEE Transactions on Information Forensics and Security, vol. 3, No. 1, Mar. 2008, pp. 76-86.*
Cozzolino, et al., "Noiseprint: A CNN-Based Camera Model Fingerprint," Sep. 11, 2019, arXiv:1808.08396v1, IEEE Transactions On Information Forensics and Security, vol. 15, 2020, pp. 144-157.*
Jessica Fridrich, "Rich Models for Steganalysis of Digital Images," May 8, 2012, IEEE Transactions on Information Forensics and Security, vol. 7, No. 3, Jun. 3, 2012, pp. 868-880.*
Aurobrata Ghosh, "To Beta or Not to Beta: Information Bottleneck for Digital Image Forensics,"Aug. 11, 2019, 33rd Conference on Neural Information Processing Systems (NeurIPS 2019) , pp. 2-7.*
International Search Report of the International Searching Authority dated Sep. 11, 2020, issued in connection with International Application No. PCT/US20/39394 (3 pages).
Written Opinion of the International Searching Authority dated Sep. 11, 2020, issued in connection with International Application No. PCT/US20/39394 (5 pages).

Cozzolino, et al., "Noiseprint: A Cnn Based Camera Model Fingerprint," Cornell University, Aug. 25, 2018, https://arxiv.org/pdf/1808.08396 (13 pages).
Chen, et al., "Poster: Remix: Mitigating Adversarial Perturbation by Reforming, Masking and Inpainting," online publication dated Mar. 8, 2019, https://pdfs.semanticscholar.org/f2d9/3935e87ed219d5a2990c7b37300b519ef4a0.pdf (3 pages).
Ghosh, et al., "To Beta or Not to Beta: Information Bottleneck for Digital Image Forensics," 33rd Conference on Neural Information Processing Systems (NeurIPS 2019) (11 pages).
Achille, et al., "Information Dropout: Learning Optimal Representations Through Noisy Computation," IEEE Transactions on Pattern Analysis and Machine Intelligence, vol. 40, No. 12, Dec. 2018 (9 pages).
Agarwal, et al., "Photo Forensics from JPEG Dimples," In 2017 IEEE Workshop on Information Forensics and Security (WIFS), (2017) (6 pages).
Alemi, et al., "Fixing a Broken ELBO," In Proceedings of the 35th International Conference on Machine Learning (ICML), Jul. 2018 (10 pages).
Alemi, et al., "Deep Variational Information Bottleneck," In International Conference on Learning Representations (ICLR) (2017) (19 pages).
Ghosh, et al., "SpliceRadar: A Learned Method for Blind Image Forensics," arXiv:1906.11663v1, Jun. 27, 2019 (8 pages).
Barber, et al., The IM Algorithm: A Variational Approach to Information Maximization, in NeurIPS (2003).
Barni, et al., "Higher-Order, Adversary-Aware, Double JPEG-Detection via Selected Training on Attacked Samples," In 25th European Signal Processing Conference (EUSIPCO) (2017) (5 pages).
Belghazi, et al.,"Mutual Information Neural Estimation," In Proceedings of the 35th International Conference on Machine Learning, (ICML), Jul. 2018 (18 pages).
Bondi, et al., "Tampering Detection and Localization through Clustering of Camera-Based CNN Features," In The IEEE Conference on Computer Vision and Pattern Recognition Workshops (2017 (10 pages).
Burgess, et al., "Understanding Disentangling in ?-VAE," arXiv: 1804.03599v1, Apr. 10, 2018 (11 pages).
Chen, et al., "Determining Image Origin and Integrity Using Sensor Noise," IEEE Transactions on Information Forensics and Security, vol. 3, No. 1, Mar. 2008 (17 pages).
Chen, et al., "Info-GAN: Interpretable Representation Learning by Information Maximizing Generative Adversarial Nets," 30th Conference on Neural Informational Processing Systems (NIIPS 2016) (9 pages).
Cozzolino, et al., "Splicebuster: A New Blind Image Splicing Detector," In 2015 IEEE International Workshop on Information Forensics and Security (WIFS) (2015) (6 pages).
Cozzolino, et al., "Noiseprint: A CNN-Based Camera Model Fingerprint," arXiv: 1808.08396v1, Aug. 25, 2018 (13 pages).
Carvalho, et al., "Exposing Digital Image Forgeries by Illumination Color Classification," IEEE Transactions on Information Forensics and Security, vol. 8, No. 7, Jul. 2013 (13 pages).
Hjelm, et al., "Learning Deep Representations by Mutual Information Estimation and Maximization," arXiv: 1808.06670v2, Aug. 24, 2018 (17 pages).
Dirik, et al., "Image Tamper Detection Based on Demosaicing Artifacts," In in Proceedings of the 2009 IEEE International Conference on Image Processing (4 pages).
Fiscus, et al., "The 2017 Nimble Challenge Evaluation: Results and Future Directions," CVPR Wokshop on Media Forensics, Jul. 26, 2017 (34 pages).
Fridrich, et al., "Rich Models for Steganalysis of Digital Images," IEEE Transactions on Information Forensics and Security, vol. 7, No. 3, Jun. 3, 2012 (15 pages).
Gloe, et al., "The 'Dresden Image Database' for Benchmarking Digital Image Forensics," In Proceedings of the 25th Symposium On Applied Computing (ACM SAC) (2010) (7 pages).
Goodfellow, et al., "Generative Adversarial Nets," In NeurIPS (2014) (9 pages).

(56) References Cited

OTHER PUBLICATIONS

He, et al., "Deep Residual Learning for Image Recognition," In The IEEE Conference on Computer Vision and Pattern Recognition (CVPR) (2016) (9 pages).
Higgins, et al., "?-VAE: Learning Basic Visual Concepts with a Constrained Variational Framework," In International Conference on Learning Representations (ICLR) (2017) (22 pages).
Huh, et al., "Fighting Fake News: Image Splice Detection Via Learned Self-Consistency," In Proceedings of the European Conference on Computer Vision (ECCV) (2018) Springer International Publishing (19 pages).
Kingma, et al., "Auto-Encoding Variational Bayes," arXiv:1312.6114v10, May 1, 2014 (14 pages).
Liu, et al., "Image Inpainting for Irregular Holes Using Partial Convolutions," In Proceedings of the European Conference on Computer Vision (ECCV) (2018) (17 pages).
Lukas,, et al., "Detecting Digital Image Forgeries Using Sensor Pattern Noise," Proceedings of SPIE—The International Society for Optical Engineering (2006) (12 pages).
Mahdian, et al., "Using Noise Inconsistencies for Blind Image Forensics," Image and Vision Computing (2009) (7 pages).
Mayer, et al., "Learned Forensic Source Similarity for Unknown Camera Models," In IEEE International Conference on Acoustics, Speech and Signal Processing (ICASSP) (2018) (5 pages).
Nazeri, et al., "EdgeConnect: Generative Image Inpainting with Adversarial Edge Learning," arXiv: 1901.00212v3, Jan. 11, 2019 (17 pages).
Otsu, "A Threshold Selection Method from Gray-Level Histograms," IEEE Transactions on Systems, Man, and Cybernetics (1979) (5 [pages).
Peng, et al., "Variational Discriminator Bottleneck: Improving Imitation Learning, Inverse RL, and GANs by Constraining Information Flow," In International Conference on Learning Representations (ICLR) (2019) (27 pages).
Popescu, et al., "Exposing Digital Forgeries in Color Filter Array Interpolated Images," IEEE Transactions on Signal Processing, vol. 53, No. 10 (2005) (12 pages).
Saxe, et al., "On the Information Bottleneck Theory of Deep Learning," In International Conference on Learning Representations (ICLR) (2018) (27 pages).
Shwartz-Ziv, et al., "Opening the Black Box of Deep Neural Networks via Information," arXiv: 1703.00810v3, Apr. 29, 2017 (19 pages).
Tishby, et al., "The Information Bottleneck Method," In Proceedings of the 37th Annual Allerton Conference on Communication, Control and Computing (1999).
Yu, et al., "Generative Image Inpainting with Contextual Attention," In Proceedings of the IEEE Conference on Computer Vision and Pattern Recognition (CVPR) (2018) (10 pages).
Zampoglou, et al., "Large-Scale Evaluation of Splicing Localization Algorithms for Web Images," Multimedia Tools and Applications (2017) (34 pages).
Zhou, et al., "Learning Rich Features for Image Manipulation Detection," In IEEE Conference on Computer Vision and Pattern Recognition (2018) (9 pages).
European Search Report dated Jan. 30, 2023, issued by the European Patent Office in connection with European Application No. 20832023.4 (11 pages).

\* cited by examiner

| (F1) | DSO-1 | NC16 | NC17-dev1 | (MSC) | DSO-1 | NC16 | NC17-dev1 |
|---|---|---|---|---|---|---|---|
| NoMI | 0.64 (0.52) | 0.39 (0.29) | 0.39 (0.31) | NoMI | 0.60 (0.47) | 0.37 (0.27) | 0.32 (0.22) |
| MI [5] | 0.69 (0.59) | 0.39 (0.28) | 0.40 (0.32) | MI [5] | 0.65 (0.55) | 0.37 (0.26) | 0.33 (0.25) |
| IP1e-3 | 0.71 (0.55) | 0.42 (0.29) | 0.44 (0.31) | IP1e-3 | 0.67 (0.53) | 0.40 (0.28) | 0.38 (0.25) |
| IP5e-4 | 0.72 (0.58) | 0.40 (0.29) | 0.42 (0.31) | IP5e-4 | 0.69 (0.55) | 0.38 (0.27) | 0.35 (0.24) |
| SB | 0.66 (0.54) | 0.37 (0.26) | 0.43 (0.36) | SB | 0.61 (0.48) | 0.34 (0.25) | 0.36 (0.25) |
| EX-SC | 0.57 (0.49) | 0.38 (0.31) | 0.44 (0.37) | EX-SC | 0.52 (0.43) | 0.36 (0.29) | 0.38 (0.30) |

FIG. 8A

| (AUC) | DSO-1 | NC16 | NC17-dev1 |
|---|---|---|---|
| NoMI | 0.87 | 0.80 | 0.80 |
| MI [5] | 0.90 | 0.81 | 0.80 |
| IP1e-3 | 0.92 | 0.83 | 0.82 |
| IP5e-4 | 0.92 | 0.83 | 0.82 |
| SB | 0.86 | 0.77 | 0.77 |
| EX-SC | 0.85 | 0.80 | 0.81 |

FIG. 8B

MACHINE LEARNING SYSTEMS AND METHODS FOR IMPROVED LOCALIZATION OF IMAGE FORGERY

RELATED APPLICATIONS

The present application claims the benefit of U.S. Provisional Application Ser. No. 62/865,414 filed on Jun. 24, 2019, the entire disclosure of which is expressly incorporated herein by reference.

BACKGROUND

Technical Field

The present disclosure relates generally to the field of machine learning. Specifically, the present disclosure relates to machine learning systems and methods for improved localization of image forgery.

RELATED ART

Photo-realistically altering the contents of digital images and videos is problematic as society becomes increasingly reliant on digital images and videos as dependable sources of information. Altering image contents is facilitated by the availability of image editing software and aggravated by recent advances in deep generative models such as generative adversarial networks (GAN). Digital image forensics focuses on this issue by addressing critical problems such as establishing the veracity of a digital image (e.g., manipulation detection), localizing a tampered region within the image (e.g., manipulation localization), and identifying an alteration type. Different alteration types require different forensic techniques. One type of alteration includes introducing foreign material into an image. For example, splicing can be utilized to insert a part of one image into another image or inpainting can be utilized to insert an object into an image via a specialized algorithm. Semantic information has had limited success in solving such operations because skilled attackers utilize semantic structures to hide image alterations. Non-semantic pixel-level statistics have proven more successful since these statistics amplify low-level camera model specific distortions and noise patterns (i.e., a camera model's digital fingerprint). A camera model digital fingerprint can aid in resolving an integrity of an image by determining whether the camera model fingerprint is consistent across an entirety of the image. Several hand-engineered, low-level statistical approaches have been explored. However, given the aforementioned availability of image editing software and the technological improvement of recent deep generative models, there is a need for forensic algorithms that can provide data-driven deep learning solutions for the localization of image forgery.

Therefore, there is a need for machine learning systems and methods which can improve the localization of image forgery while improving an ability of computer systems to more efficiently process data. These and other needs are addressed by the machine learning systems and methods of the present disclosure.

SUMMARY

The present disclosure relates to machine learning systems and methods for improved localization of image forgery. The system generates a variational information bottleneck objective function and works with input image patches to implement an encoder-decoder architecture. The encoder-decoder architecture controls information flow between the input image patches and a representation layer. The system utilizes information bottleneck to learn useful noise-residual patterns and discard semantic content present in each input image patch. In particular, the system extracts noise-residual patterns by considering learned local noise models and learns a suitable representation (e.g., a statistical fingerprint of a source camera model of each input image patch) from the extracted noise-residual patterns. The system trains a neural network to learn the representation indicative of the statistical fingerprint of the source camera model of each input image patch while excluding the semantic content thereof. The system determines a splicing manipulation localization by the trained neural network.

BRIEF DESCRIPTION OF THE DRAWINGS

The foregoing features of the invention will be apparent from the following Detailed Description of the Invention, taken in connection with the accompanying drawings, in which:

FIGS. 8A-B are tables illustrating quantitative processing results of the system of the present disclosure on different datasets and according to different scoring metrics;

DETAILED DESCRIPTION

Figure 1:
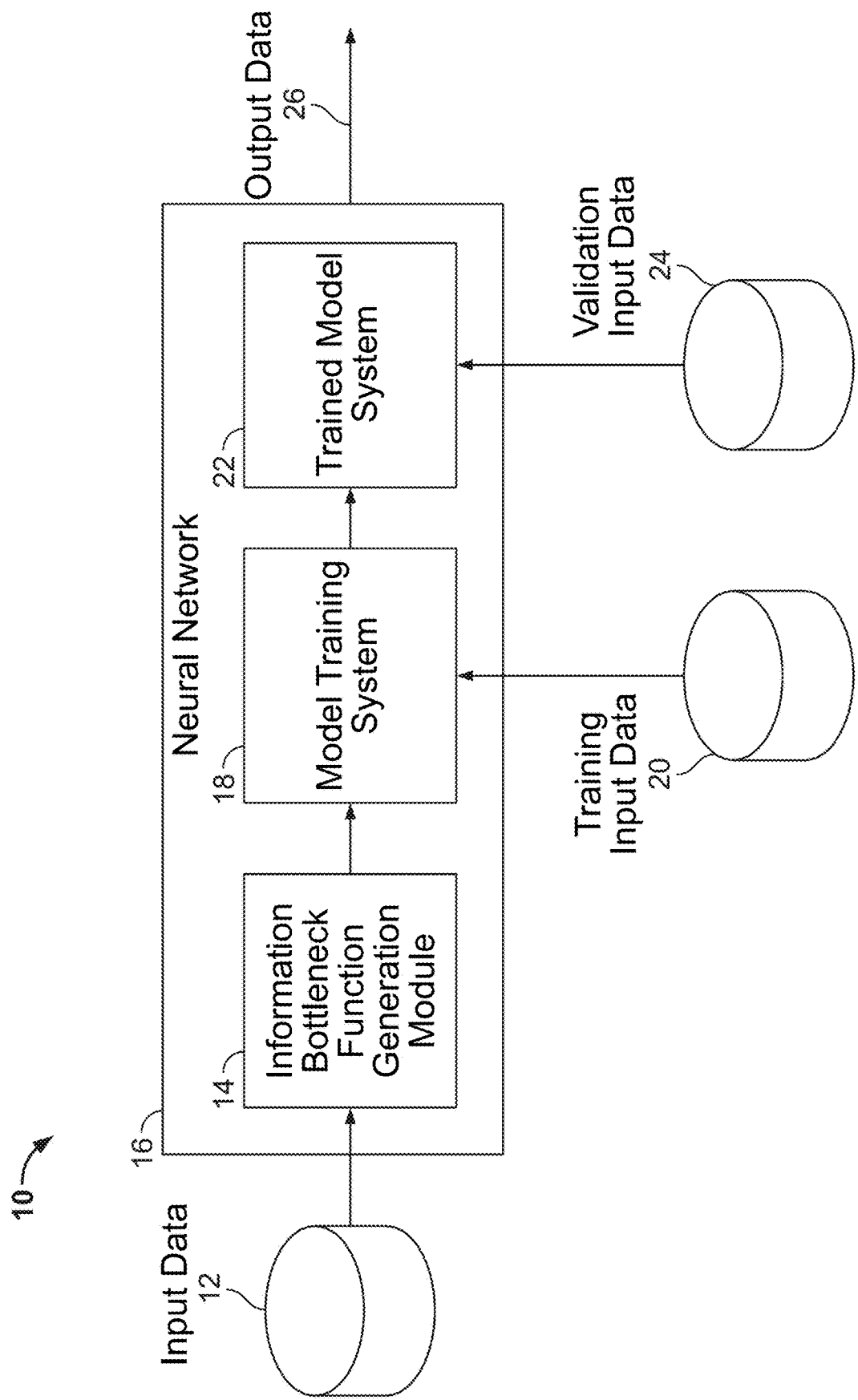
FIG. 1 is a diagram illustrating the system of the present disclosure.

The present disclosure relates to systems and methods for improved localization of image forgery, as described in detail below in connection with FIGS. 1-12.

By way of background, the image formation process broadly consists of three stages: (1) sensor measurements; (2) in-camera processing; and (3) storage which may include compression. The image formation process is unique for every camera model and yields subtle distortions and noise patterns (i.e., a digital camera model fingerprint) in the image which are invisible to the eye. These subtle distortions and noise patterns are useful in forensic applications because they are specific to each camera model. Sensor pattern noise originates from imperfections in the sensor itself and has shown to be sensitive to several manipulation types. Accordingly, sensor pattern noise has been utilized for the detection and localization of forgeries. However, sensor pattern noise is difficult to detect in image regions with high texture and is absent or suppressed in saturated and dark regions of an image. Color filter array (CFA) demosaicking is an in-camera processing step that produces pixel colors. Different detection and localization strategies based on CFA signature inconsistencies are known. However, the scope of such specialized CFA models is often limited. Joint Photographic Experts Group (JPEG) is a common storage form and carries camera model signatures such as dimples or can contain clues regarding post-processing steps such as traces of multiple compressions. Although, JPEG statistics have been utilized for detection and localization tasks, these statistics are format specific and do not generalize to other common or new formats.

More generic approaches include modeling noise-residuals. A noise-residual is a statistical pattern that is not attached to a specific source but is instead a result of the combined processes of an imaging pipeline. Noise-residuals can be discerned by suppressing the semantic contents of an image. For example, one known approach utilizes a wavelet transform as a high-pass filter to estimate noise-residuals and then determine its inconsistencies. Other known approaches utilize spatial rich filters (RFs). Spatial RFs are a set of alternate high-pass filters to model local noise-residuals. For example, one known approach explores co-occurrences of one RF while another known approach utilizes three residual filters along with color information in a convolutional neural network (CNN) to localize manipulations. Learned RFs utilizing constrained convolutions have also been employed for localizing manipulations. Noiseprint, another known approach, utilizes a denoising CNN to estimate properties of noise-residuals and changes therein to discover manipulations. Additionally, another known approach, utilizes a CNN trained for camera model identification to discover manipulations but does not exploit noise-residuals and relies on a CNN architecture to learn semantic contents.

The system of the present disclosure utilizes a constrained convolution layer to mimic RFs and information bottleneck to learn noise-residual patterns and localize manipulations. The system of the present disclosure demonstrates that information bottleneck provides for a formal framework to interpret mutual information-based regularization. This interpretation provides for a more efficient solution utilizing variational approximation and provides for tuning the regularization in a principled manner to enhance forensic performance.

Information theory is a framework that provides for improving various aspects of deep machine learning including, but not limited to, representation learning, generalizability and regularization, and an interpretation of deep neural network functionality. Mutual information plays an important role in many of these methods. For example, InfoGAN has shown that maximizing mutual information between latent code and a generator's output improves the representations learned by a GAN thereby providing for the representations to be more disentangled and interpretable. Mutual information is challenging to compute and therefore InfoGAN maximizes a variational lower bound. A similar maximization approach has been explored to improve unsupervised representation learning utilizing a numerical estimator.

Information bottleneck curbs information flow between an input and a representation layer. This curbing of information flow encourages a model to learn task related features and helps improve its generalization ability. It should be understood that information bottleneck Lagrangian is challenging to solve in practice. Accordingly, variational approximations suitable for deep learning have been proposed and demonstrate that information bottleneck is closely related to variational autoencoders (VAEs). Information bottleneck can be utilized to learn disentangled representations. For example, information bottleneck approaches to improve the disentanglement of representations learned by VAEs have been investigated empirically. Additionally, a known insightful rate-distortion interpretation utilizing information bottleneck has been applied to VAEs. Information bottleneck has also been proposed as an effective regularization and shown to improve imitation learning, reinforcement learning, and the training of GANs. The system of the present disclosure leverages a variational information bottleneck formulation developed for deep neural networks utilizing a reparameterization process.

The information bottleneck framework and its variational approximation will now be described. Learning a predictive model p(y|x) is hindered when a model overfits nuisance detractors that exist in the input data X instead of focusing on relevant information for a task Y. This is of importance in deep learning when an input is high-dimensional (e.g., an image), a task is a simple low-dimensional class label, and a model is a flexible neural network. An objective of information bottleneck is to overcome this problem by learning a compressed representation Z, of X, which is optimal for the task Y in terms of mutual information. It is applied by maximizing the information bottleneck Lagrangian based on mutual information values I(Z, X) and I(Z, Y) as follows in Equation 1:

$$\mathcal{L} = I(Z,Y) - \beta I(Z,X) \quad \text{Equation 1}$$

By penalizing an information flow between X and Z while maximizing the mutual information required for the task, information bottleneck extracts the relevant information that X contains regarding Y and discards non-informative signals. This provides for learning a representation Z with an improved generalization ability.

As mentioned above, it should be understood that mutual information is challenging to compute in a general setting and even more so with high dimensional variables. As such, a known approach applies a variational approximation to a neural network. In particular, let Z be a stochastic encoding layer and based on the definition of mutual information, Equation 2 yields:

$$I(Z, Y) = \int p(y, z) \log \frac{p(y, z)}{p(y)p(z)} dy dz = \quad \text{Equation 2}$$

$$\int p(y, z) \log p(y|z) dy dz - \int p(y) \log p(y) dy$$

In Equation 2, the last term is ignored as it is the entropy of y and is constant. The first term p(y|z) is intractable and is approximated utilizing a variational distribution q(y|z), the decoder network. Then, a lower bound of I(Z, Y) is determined because the KL divergence KL[p(y|z)∥q(y|z)] ≥0⇒∫p(y|z)log p(y|z)dy≥∫p(y|z)log q(y|z)dy and by assuming a Markov chain relation Y→X→Z, yields Equation 3:

$$I(Z,Y) \geq \mathbb{E}_{x,y \sim p(x,y)} \mathbb{E}_{z \sim p(z|x)}[\log q(y|z)]] \quad \text{Equation 3}$$

where p(z|x) is an encoder network and p(x, y) can be approximated utilizing the training data distribution. Therefore, the right hand side of Equation 3 becomes the average cross-entropy (with stochastic sampling over z). Proceeding similarly, Equation 4 yields:

$$I(Z, X) = \int p(x, z) \log \frac{p(x, z)}{p(x)p(z)} dxdz = \quad \text{Equation 4}$$

$$\int p(x, z) \log p(z|x) dxdz - \int p(z) \log p(z) dz$$

In this case, p(z) is intractable and is approximated by a prior marginal distribution r(z). An upper bound for I(Z, X) is determined because KL[p(z)||r(z)]≥0⇒∫p(z) log p(z)dz≥∫p (z)log r(z)dz, therefore Equation 5 yields:

$$I(Z, X) \leq \int p(x)p(z|x) \log \frac{p(z|x)}{r(z)} dxdz = \quad \text{Equation 5}$$

$$\mathbb{E}_{x \sim p(x)}[KL[p(z|x)||r(z)]]$$

p(x) can be approximated utilizing the data distribution. Replacing Equations 3 and 5 in Equation 1 yields the variational information bottleneck function as shown in Equation 6:

$$J_{IB}(p, q) = \quad \text{Equation 6}$$

$$\frac{1}{N} \sum_{i=1}^{N} \mathbb{E}_{z \sim p(z|x_i)}[-\log q(y_i|z)] + \beta KL[p(z|x_i)||r(z)] \geq -\mathcal{L}$$

The variational information bottleneck function can be minimized utilizing a known reparameterization process. According to a rate-distortion interpretation of information bottleneck, the loss term is denoted as distortion D and approximates the non-constant part of −I(Z, Y) while the unweighted regularization term is denoted as rate R and approximates I(Z, X). R measures an excess number of bits required to encode representations. The RD-plane provides for visualizing a family of solutions to the information bottleneck Lagrangian for different values of β and provides insight into properties of the encoder-decoder network.

The system of the present disclosure allows for localization of a digital manipulation that inserts foreign material into a host image to alter its contents (e.g., a splicing operation). Since a splicing operation is often camouflaged by semantic structures, such manipulations can be localized by inspecting low-level pixel statistics. Generally, a splicing operation will contain a different statistical profile (e.g., fingerprint) than the host image because the splicing operation likely originates from a different camera model or a different image formation process (e.g., inpainting). The system of the present disclosure allows for localization of an image manipulation by utilizing an information bottleneck-based loss to learn to ignore semantic content of an image. In particular, the system trains a deep neural network to learn a representation that captures a statistical fingerprint of a source camera model from an input image patch while ignoring the semantic content of the input image patch. Then, the system computes the fingerprint representation for different parts of a test image. Lastly, the system searches for inconsistencies among the computed fingerprint representations to localize splicing manipulations. It should be understood that the system trains the neural network with a large number of camera models to improve the ability of the system to distinguish even unseen camera models. Accordingly, the network can be effective in a blind test context when applied on images acquired from unknown camera models.

Turning to the drawings, FIG. 1 is a diagram illustrating the system 10 of the present disclosure. The system 10 includes a neural network 16 having an information bottleneck function generation module 14 that receives input data 12. The neural network 16 can receive training input data 20 and validation input data 24. The neural network 16 further includes a model training system 18 and a trained model system 22, and outputs output data 26. The neural network 16 can be any type of neural network or machine learning system, or combination thereof. For example, the neural network 16 can be a deep neural network capable of, for example, image forgery localization and can use one or more frameworks (e.g., interfaces, libraries, tools, etc.).

Figure 2:
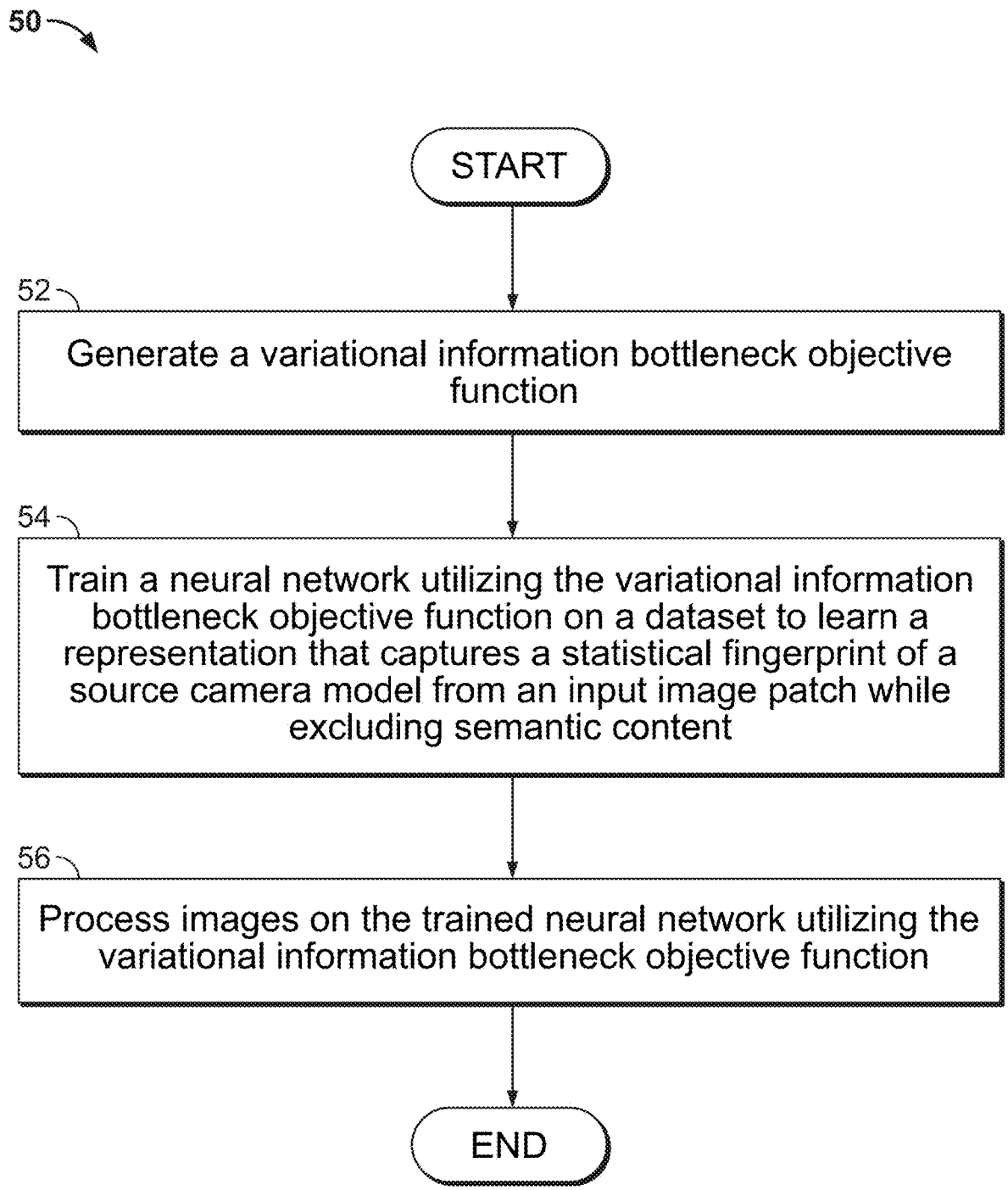
FIG. 2 is a flowchart illustrating overall processing steps carried out by the system of the present disclosure.

FIG. 2 is a flowchart 50 illustrating overall processing steps carried out by the system 10 of the present disclosure. Beginning in step 52, the information bottleneck function generation module 14 generates a variational information bottleneck objective function. The information bottleneck function generation module 14 receives input data 12. Utilizing information bottleneck provides for framing the issue of localizing manipulations in an image as a deep representation learning problem and provides a framework for interpreting a deep neural network. In particular, utilizing information bottleneck casts the problem of modelling and distinguishing low-level camera model statistics as a data-driven representation learning problem. The system 10 works with input image patches to implement an encoder-decoder architecture. The encoder-decoder architecture controls an information flow between the input image patches and a representation layer. This constriction of mutual information allows the neural network 16 to ignore irrelevant semantic content contained in any image patch and focus its capacity on learning useful features required to classify a source camera model. As such, the system 10 utilizes information bottleneck to learn useful residual noise patterns and ignore semantic content. As mentioned above, a learned noise pattern representation can be considered as a camera model signature (i.e., fingerprint).

In step 54, the model training system 18 trains the neural network 16 utilizing the information bottleneck function on training input data 20. In particular, the model training system 18 trains the neural network 16 to learn a representation indicative of a statistical fingerprint of a source camera model from an input image patch while excluding semantic content thereof. The training input data 20 can include, but is not limited to, a predetermined number of images of the Dresden Image Database that contains more than 17,000 JPEG images from 27 source camera models. It should be understood that the neural network 16 can be any type of neural network or machine learning system, or combination thereof, utilizing the information bottleneck function. Additionally, it should be understood that the system 10 may utilize a different neural network 16 based on the training input data 20. For example, the system 10 may utilize a model with mutual information regularization and a model without mutual information regularization when training on the Dresden Image Database. Then, in step 56, the trained model system 22 processes validation input data 24 to determine whether the system 10 can localize an image manipulation. The validation input data 24 can include, but is not limited to, a predetermined number of images of the DSO-1, Nimble Challenge 2016 (NC16) and the Nimble Challenge 2017 (NC17-dev1) datasets.

Figure 3:
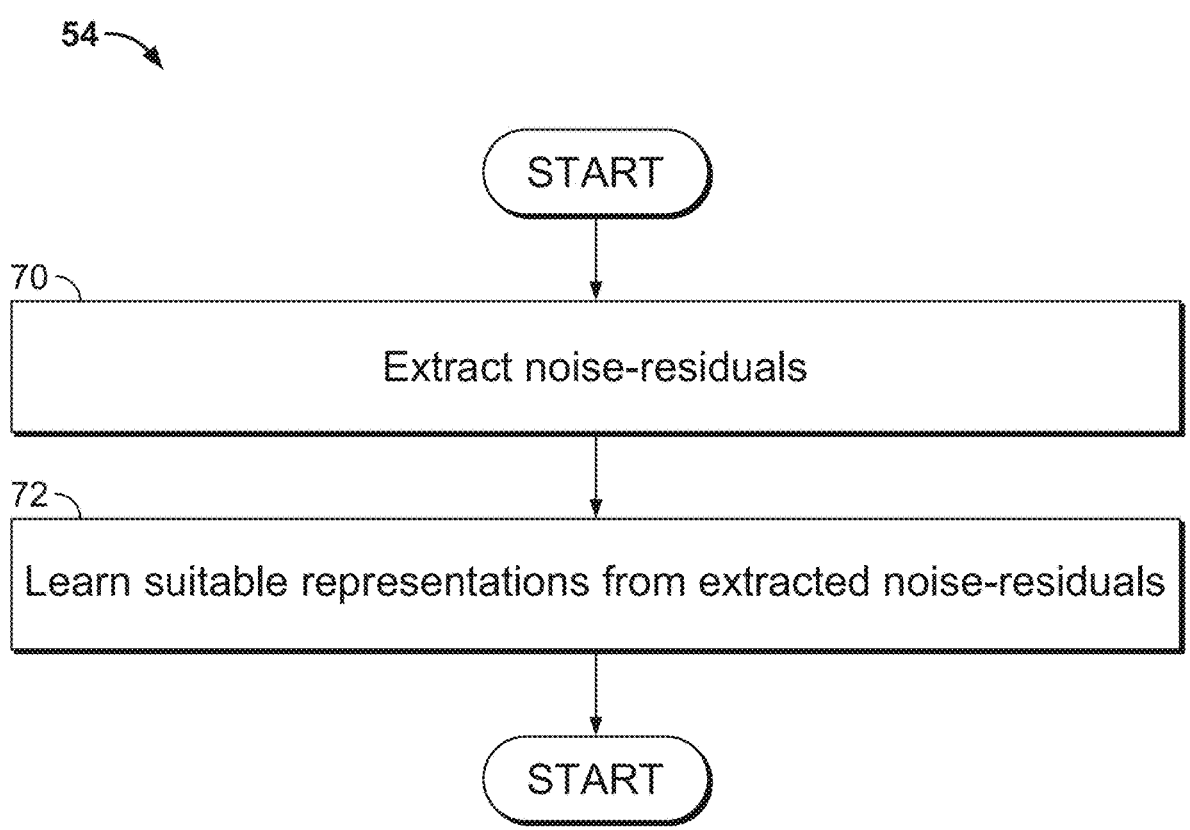
FIG. 3 is a flowchart illustrating step 54 of FIG. 2 in greater detail.

FIG. 3 is a flowchart illustrating step 54 of FIG. 2 in greater detail. The system 10 learns a low level representation by extracting noise-residuals and learning suitable representations from the extracted noise-residuals. Beginning in step 70, the system 10 extracts noise-residuals by considering learned local noise models. In particular, the system 10 considers a constrained convolution layer according to Equation 7 as follows:

$$\mathcal{R}^{(k)} = w_k(0, 0) + \sum_{i,j \neq 0,0} w_k(i, j) = 0 \quad \text{Equation 7}$$

The constrained convolution layer binds the weights of the $k^{th}$ filter to determine a mismatch or noise-residual, between a pixel's value at position (0, 0) and its value as interpolated from its S×S neighbors. These are high-pass filters similar to RFs that model noise-residuals locally by suppressing semantic content and can be trained end-to-end by including a penalty $\mathcal{R} = (\Sigma_k (\mathcal{R}^{(k)})^2)^{1/2}$ in the optimization.

It should be understood that since these noise models are high-pass filters, the models also capture high-frequency semantic content such as edges and textures which carry scene related information the system 10 seeks to suppress. Ideal noise-residuals are considered to be high-frequency content uncorrelated to semantic information. It is possible to learn these noise-residuals by regularizing mutual information between an input and a feature layer in a neural network. Intuitively, this would discourage a correlation between learned features and semantic content in the input. However, and as mentioned above, mutual information is challenging to compute. Accordingly, the system 10 re-interprets the mutual information regularization through the information bottleneck framework. As such, the system 10 can employ an efficient variational solution and explore longer training processes and provide an RD-plane that can be evaluated to select the best regularization parameter β of Equation 6. In step 72, the system 10 learns suitable representations from the extracted noise-residuals. Step 72 will be described in further detail below in connection with FIG. 4.

Figure 4:
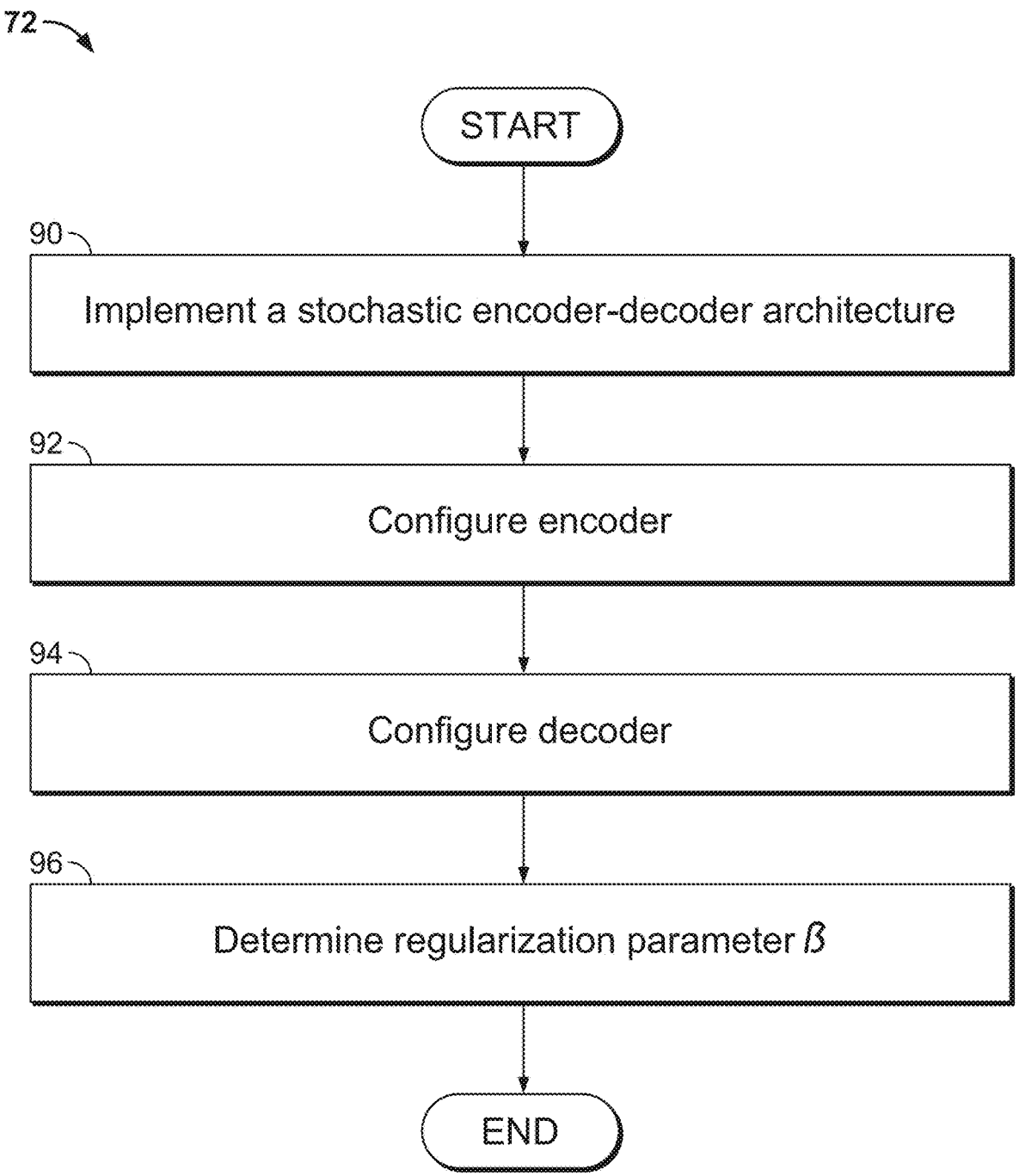
FIG. 4 is a flowchart illustrating step 72 of FIG. 3 in greater detail.

FIG. 4 is a flowchart illustrating step 72 of FIG. 3 in greater detail. Beginning in step 90, the system 10 implements a stochastic encoder-decoder architecture to learn suitable representations utilizing information bottleneck. As the input, the system 10 considers X to be an image patch, Y to be a class label for a task of camera model identification and Z to be a stochastic encoding layer. The system 10 selects a classification task to learn non-semantic features from the input image patch since the semantic content of an image is not relevant to the classification of a camera model. Additionally, the system 10 can exploit large camera tagged untampered image databases for training which provides for avoiding specialized manipulated datasets and averting the chances of overfitting to the specialized manipulated datasets. As implemented, the system 10 can train the neural network 16 by minimizing the variational IB objective function of Equation 6.

In step 92, the system 10 configures the encoder p(z|x). The system 10 can utilize an architecture inspired by residual network 18 (ResNet-18) version-1 including an initial constrained convolution layer (as shown in Equation 7) to model noise-residuals and discard operations that quickly shrink the input and encourage learning high level (i.e., semantic) features. Namely, the system 10 discards an initial max-pooling layer, convolutions with a stride greater than one, and a final global average pooling layer. The system 10 also inserts additional 7×7 and 5×5 convolutions to end the network with a single "feature-pixel" with a large bank of filters to avoid fully connected layers.

Figure 5:
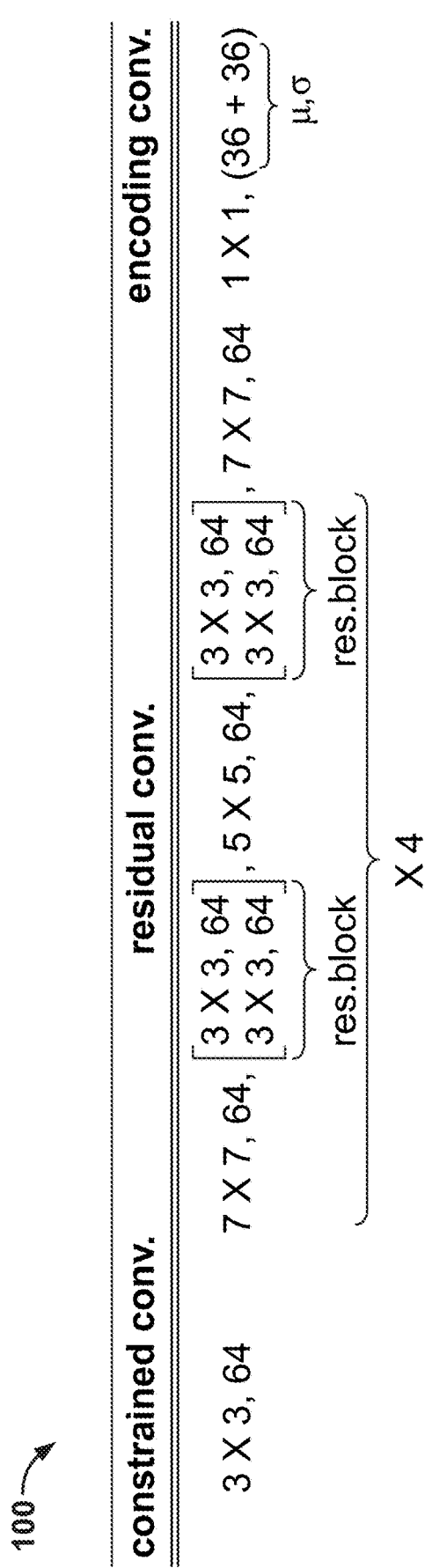
FIG. 5 is a table illustrating a neural network architecture of the system of the present disclosure.

FIG. 5 is a table 100 illustrating the architecture of the neural network 16 of the system 10 of the present disclosure. In particular, the neural network 16 is a CNN having 27 layers where every convolution is followed by batch normalization and ReLU activation. The convolutions have a stride of 1. The input patch size is 49×49×3 and the output encoding size is 1×1×72. To yield a stochastic encoding Z, the system 10 splits the CNN's output vector of 72 filters into $\mu_x$ and $\sigma_x$ and model $p(z|x) = N(\mu_x, \text{diag}(\sigma_x))$. The neural network 16 also includes a decoder, discussed in greater detail below in connection with FIG. 12.

Returning to FIG. 4, in step 94 the system 10 configures the decoder q(y|z). The decoder deters the CNN from degenerating to the autodecoder limit, an issue faced by VAEs with powerful decoders. As such, the system 10 configures the decoder with a simple logistic regression model having a dense (log it generating) layer that is connected to the stochastic code layer Z and is activated by the softmax function.

Then, in step 96, the system 10 determines the regularization parameter β. The system 10 utilizes the RD-plane to determine the characteristics of the encoder-decoder. It should be understood that an RD curve divides the plane into practical feasible and infeasible regions. Evaluating the RD curve provides for selecting a regularization parameter β to balance a trade-off between the distortion which affects task accuracy and the rate which affects compression and hence the generalization capacity. In addition to a primary task of localizing splicing manipulations, the system 10 also provides for training the neural network 16 on a secondary task of camera model identification. As such, the system 10 employs the RD curve of the training task to identify a potential range for the regularization parameter β and then selects optimal value(s) of the regularization parameter β from this range through empirical testing.

Figure 6:
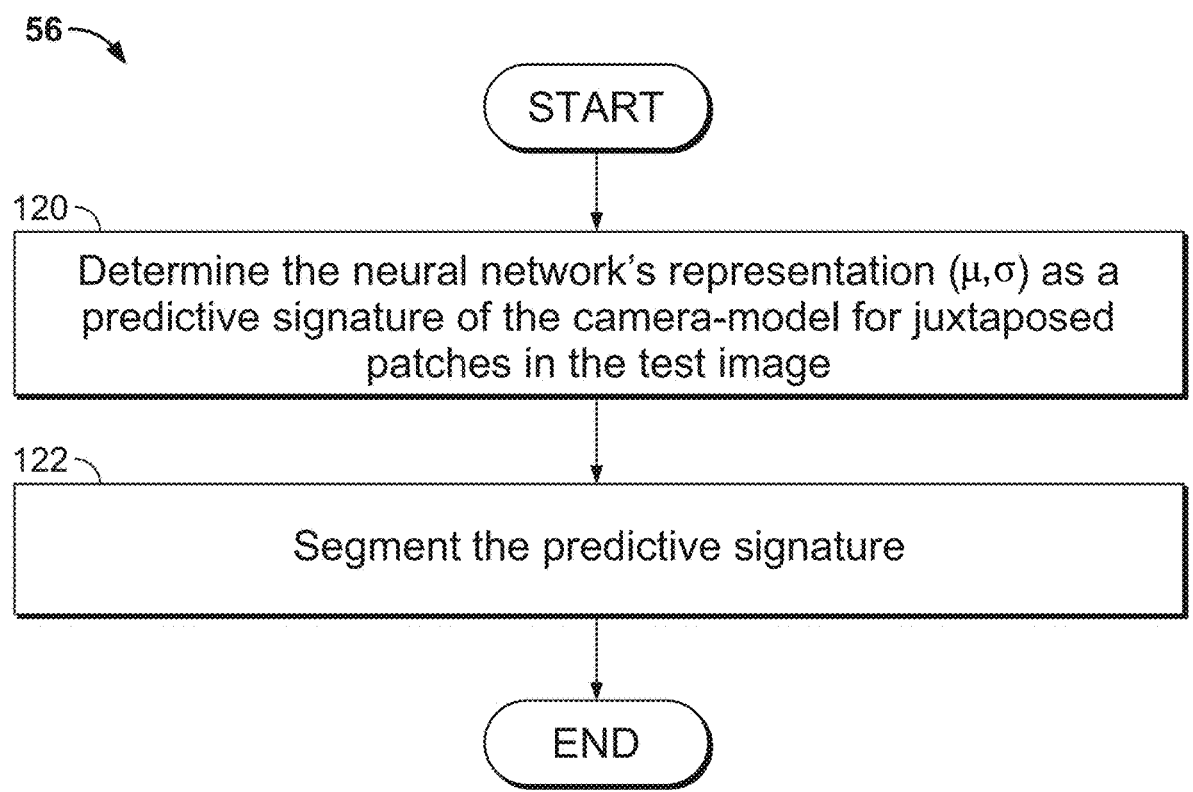
FIG. 6 is a flowchart illustrating step 56 of FIG. 2 in greater detail.

FIG. 6 is a flowchart illustrating step 56 of FIG. 2 in greater detail. The system 10 simplifies localizing a splicing manipulation into a two-class feature segmentation problem based on the assumption that the untampered region of a test image is the largest part of the test image. Beginning in step 120, the system 10 determines the neural network's 16 representation (μ, σ) as a predictive signature of a camera model for juxtaposed patches in the test image. Then, in step 122, the system 10 segments the predictive signature via a Gaussian mixture model with two components utilizing expectation maximization (EM). This segmentation step 122 is described in greater detail below in connection with FIG. 12, and it is noted that the Gaussian mixture model is not a part of the neural network 16 described herein. It should be understood that the Gaussian distributions are approximate statistics of the features of the two classes and aid in separating the classes probabilistically. It should also be understood that the system 10 does not perform forgery detection since the system 10 identifies two classes.

Training and testing of the neural network 16 of the system 10 will now be described. The system 10 evaluates input patches of size 49×49×3 and k=64 constrained convolutions with support S=3. The encoder has a fixed number of 64 filters in every layer. Additionally, for the variational prior distribution, the system 10 utilizes a factorized standard Gaussian $r(z)=\Pi_i N_i(0, 1)$ and trains the neural network 16 utilizing the loss of Equation 8 as follows:

$$J=J_{IB}+\lambda \mathcal{R} +\omega_1\|W\|_1+\omega_2\|W\|_2 \quad \text{Equation 8}$$

In Equation 8, W denotes all weights of the neural network 16 and the system 10 empirically selects $\lambda=1$ and $\omega_1=\omega_2=1e-4$. As mentioned above, the system 10 can utilize the Dresden Image Database as the training input data 20. The Dresden Image Database consists of more than 17,000 JPEG images corresponding to 27 source camera models. For each camera model, the system 10 randomly selects 70% of the images for training, 20% for validation and 10% for testing. The system 10 trains with a mini-batch of 200 patches for 700 epochs with 100,000 randomly selected patches in every epoch. The system 10 maintains a constant learning rate of 1e-4 for 100 epochs which then linearly decays to 5e-6 in the next 530 epochs and finally exponentially decays by a factor 0.9 over the last 70 epochs. As such, the system 10 provides for a camera model prediction accuracy of ~80% on the test and validation sets for various values of the regularization parameter $\beta$.

The system 10 was implemented with TensorFlow and trained on a NVIDIA Tesla V100-SXM2 (16 GB) GPU with 32 CPUs and 240 GB RAM. It should be understood that the system 10 can be implemented utilizing other software and hardware configurations. For comparison, a deep network having 18 layers with 64 filters (instead of 19) was also trained. This network trained with 72×72×3 input patches for the same number of epochs but with a decreased batch size of 100. Additionally, the system 10 trains two neural network models. In particular, the system 10 trains a neural network model with mutual information regularization (MI) and a neural network model without mutual information regularization (NoMI). Training the variational model of the system 10 required 14 hours whereas training the MI model required eight days thereby highlighting the efficiency of the variational solution in contrast to the numerically expensive binning method (i.e., the MI model).

The processing results of the system 10 will now be described. The system 10 can be tuned by evaluating the RD curve and selecting an optimal regularization parameter $\beta$. It is noted that an ablation study is carried out to gauge a relevance of information bottleneck. The system 10 is tested on three standard manipulated datasets and scores are generated via three distinct metrics. The manipulation datasets include, but are not limited to, a predetermined number of images of the DSO-1, NC16, and the NC17-dev1 datasets. The DSO-1 dataset consists of 100 spliced images in Portable Network Graphics (PNG) format such that the tampered regions are relatively large but well camouflaged by the semantic content of each image. The NC16 dataset consists of 564 spliced images mostly in JPEG format. The NC17-dev-1 dataset consists of 1,191 images having different types of manipulations. Of these images, only spliced images are selected thereby yielding 237 images. The NC16 and NC17-dev-1 images contain a series of manipulations, some of which are complex operations that attempt to erase traces of manipulations. Furthermore, the tampered regions are often small. Each of the DSO-1, NC16 and NC17-dev1 datasets contain difficult to detect manipulations and are accompanied by ground truth manipulation masks. Additionally, manipulations created by three well known inpainting GANs are generated.

Performance of the system 10 was evaluated via three metrics including the F1 score, the Matthews Correlation Coefficient (MCC) and an area under the receiver operating characteristic curve (ROC-AUC). These metrics are known for evaluating a splicing manipulation localization. F1 and MCC require a binarized forgery prediction mask while the system 10 predicts probabilities from the EM segmentation. It is customary to generate and report scores for optimal thresholds computed from the ground truth masks. As such, scores from automatic thresholding utilizing a known method (e.g., Otsu's method) are generated and reported.

For comparison with the system 10, two ablated models are considered including the neural network model with mutual information regularization (MI) and the neural network model without mutual information regularization (NoMI) as described earlier. An optimal regularization parameter $\beta$ is selected in addition to a variational model with no information bottleneck regularization ($\beta=0$). These models and regularization values aid in gauging the importance of information regularization and provide a comparison of the efficient variational approach of the system 10 and the expensive numerical binning approach (i.e., the MI model). Additionally, other models are considered including the SpliceBuster (SB) which is a state-of-the-art splice localization algorithm and top performer of the NC17 challenge and the EX-SC which is a deep learning based algorithm that predicts meta data self-consistency to localize tampered regions.

Figure 7A:
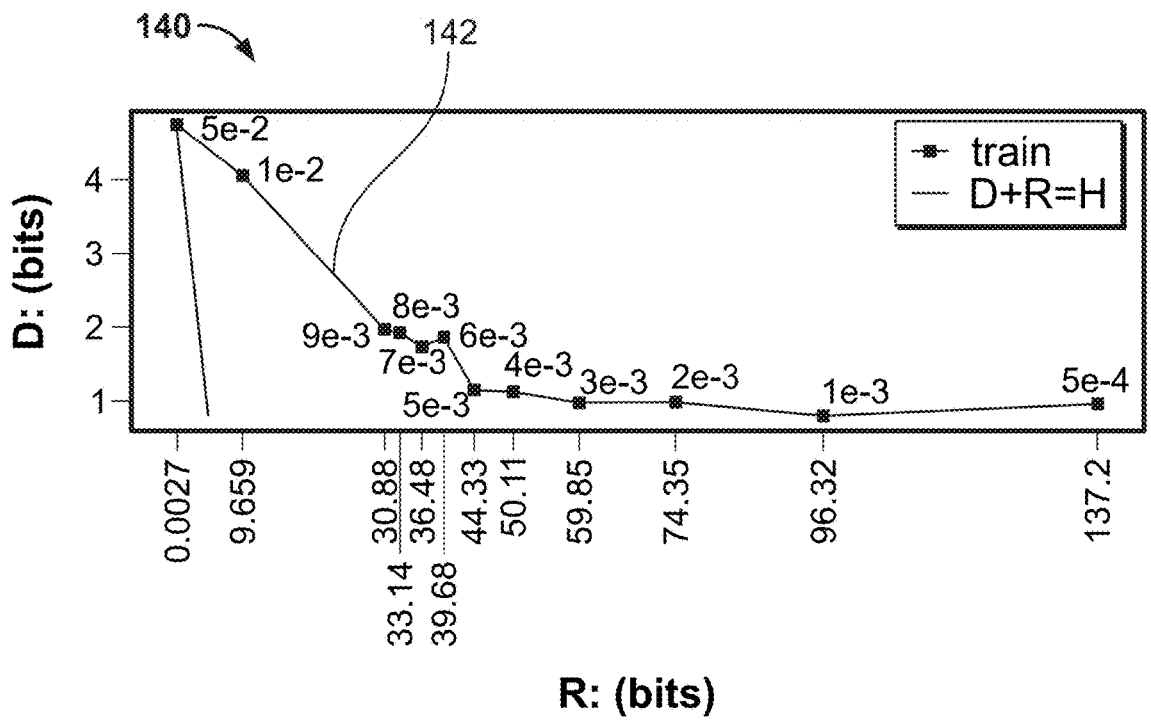
FIGS. 7A-B are graphs illustrating a range of regularization parameter values of an RD curve and a performance of selected regularization parameter values.
Figure 7B:
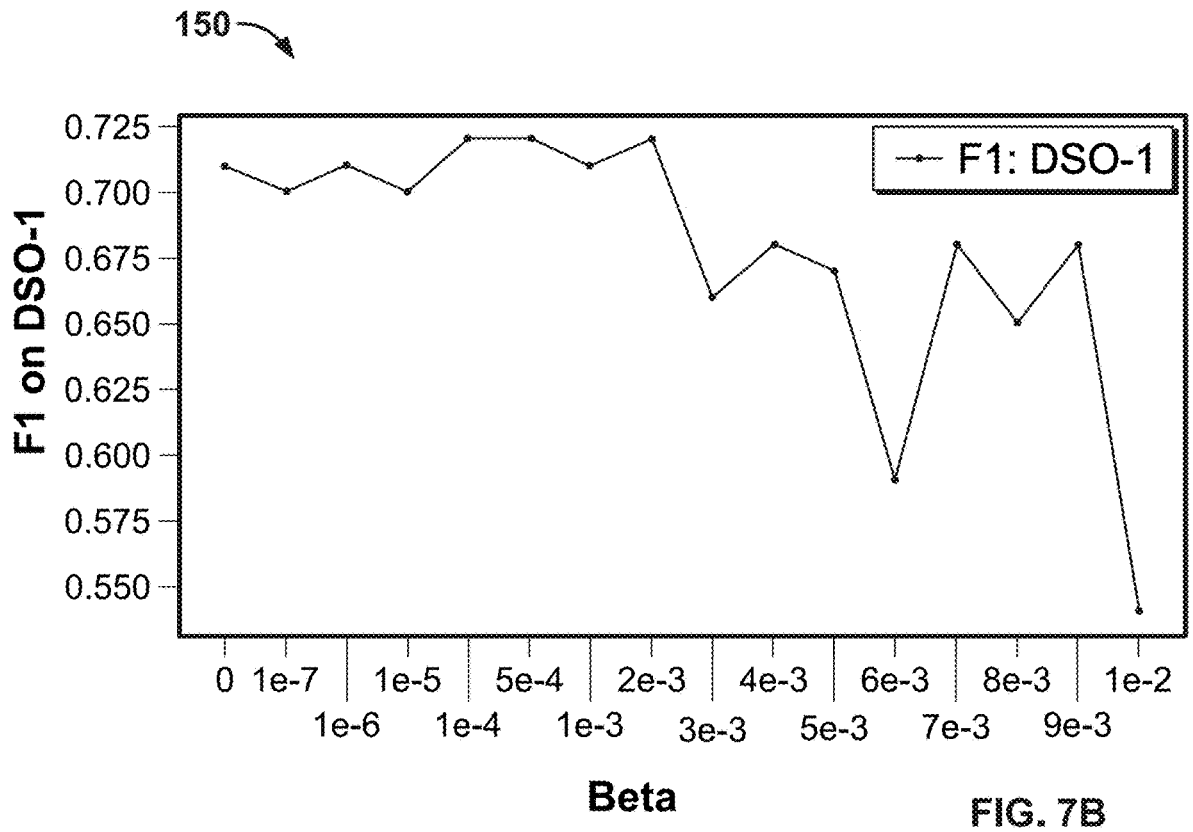

FIGS. 7A-B are graphs illustrating a range of regularization parameter values of an RD curve and a performance of selected regularization parameter values. In particular, FIG. 7A is a graph 140 illustrating a plot of an RD curve 142 from which regularization parameter values $\beta$ can be selected. As shown in FIG. 7A, the system 10 yields low distortion values for $\beta\leq5e-3$ for the training task. FIG. 7B is a graph 150 illustrating F1 scores on the DSO-1 dataset. In selecting a regularization parameter $\beta$ for the forensic task, F1 scores are determined on the DSO-1 dataset for all values of $\beta$ until 0. As shown in FIG. 7B, a peak in the F1 scores is evident from 2e-3 to 1e-4 (1e−3 is an anomaly that can be attributed to stochastic training). As such, testing is carried out for the central regularization parameter values of $\beta=1e-3$ and $5e-4$.

FIGS. 8A-8B are tables illustrating quantitative processing results of the system 10 on different datasets and according to different scoring metrics. In particular, FIG. 8A is a table 160 illustrating quantitative results for splicing manipulation localization of the system 10 and other models on the DSO-1, NC16, and NC17-dev1 datasets according to the F1 and MCC scoring metrics. Scores listed in each of the left columns are indicative of optimal thresholds and scores listed in each of the right columns are indicative of automatic thresholding utilizing a known approach (e.g., Otsu's method). As shown in FIG. 8A, the F1 scores indicate up to a 6% point improvement over SB and a 15% point improvement over EX-SC on the DSO-1 dataset and the best scores on the NC16 and NC17-dev1 datasets. The system 10 IP1e-3 and IP5e-4 model MCC scores are also high in comparison to the other models with a margin of up to 8% points on the DSO-1 dataset in comparison to SB. FIG. 8B is a table 170 illustrating quantitative results for splicing manipulation localization of the system 10 and other models on the DSO-1, NC16, and NC17-dev1 datasets according to the AUC scoring metric. As shown in FIG. 8B, a comparison of the ablated models NoMI and MI evidences that information regularization improves forensic performance. Additionally, FIG. 8B illustrates that the variational approach of the system 10 (e.g., the IP1e-3 and IP5e-4 models) outperforms the numerically expensive MI model.

Figure 9:
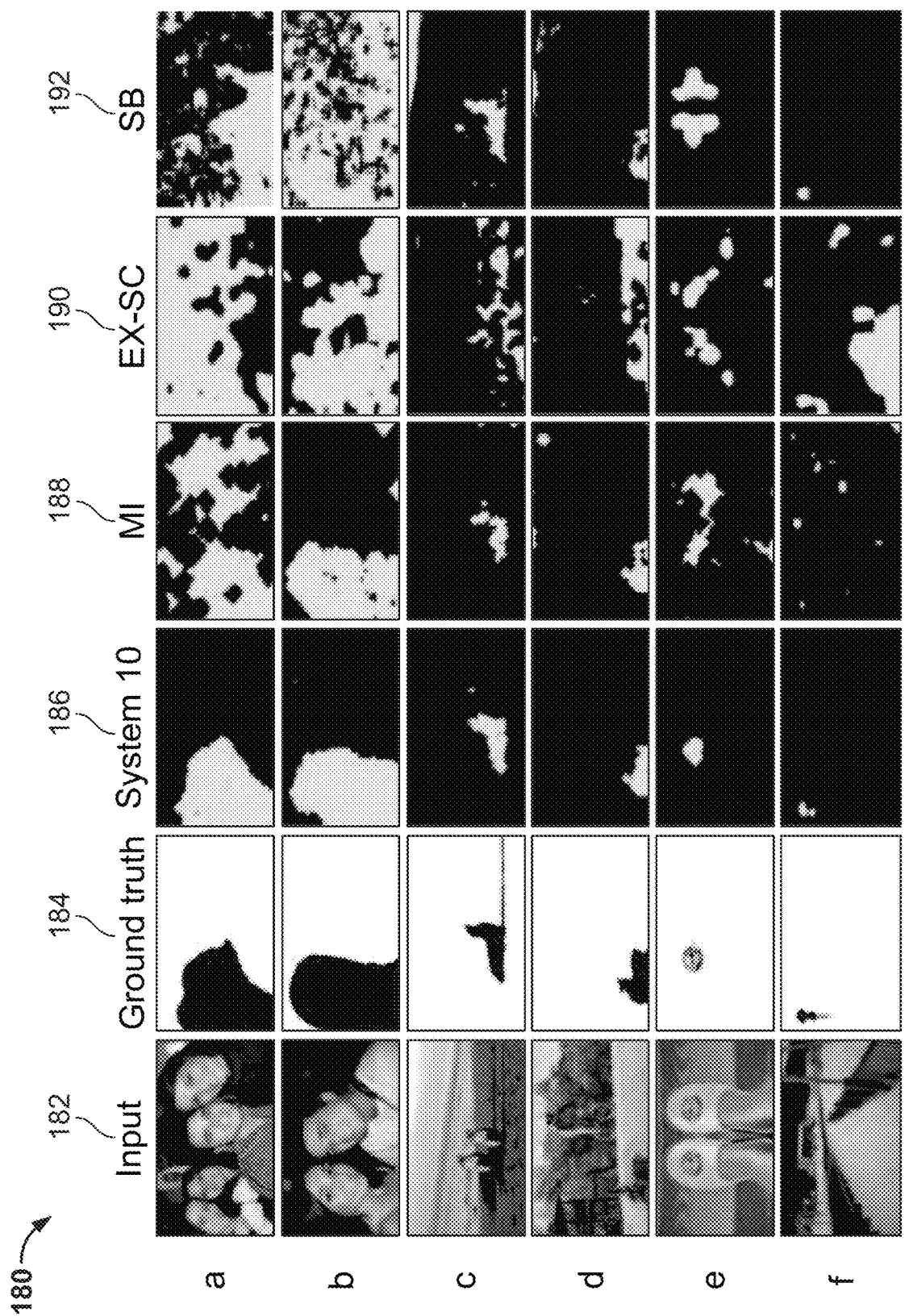
FIG. 9 is a compilation of images illustrating qualitative processing results of the system of the present disclosure in comparison to a variety of models based on several input images and ground truth masks thereof.

FIG. 9 is a diagram 180 of a compilation of images illustrating qualitative processing results of the system 10 in comparison to the MI, EX-SC and SB models based on several input images 182a-f and ground truth masks 184a-f thereof. The input images 182a-f are sourced from the DSO-1, NC16 and NC17-dev1 datasets. As shown in FIG. 9, the system 10 images 186a-f closely resemble the ground truth images 184a-f of the input images 182a-f. Further, the system 10 images 186a-f more closely resemble the ground truth images 184a-f than the MI model images 188a-f, the EX-SC model images 190a-f and the SB model images a-f.

Figure 10:
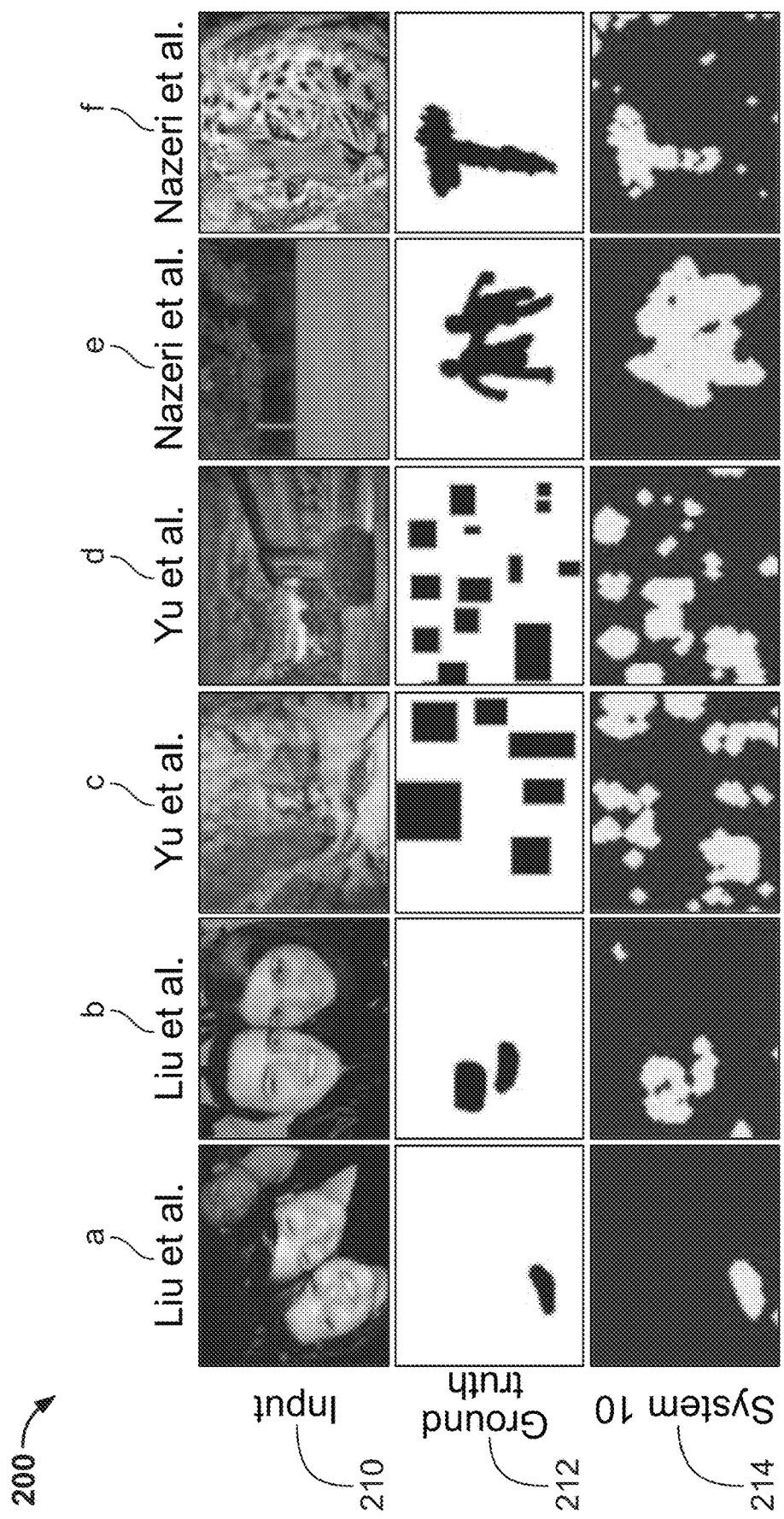
FIG. 10 is a compilation of images illustrating qualitative processing results of the system of the present disclosure based on a detection of a variety of known generative adversarial network signatures present in input images.

FIG. 10 is a compilation of images 200 illustrating qualitative processing results of the system 10 based on a detection of a variety of known GAN signatures present in input images 210a-f. As shown in FIG. 10, the system 10 detects the signatures of the inpainting GANs in the input images 210a-f. It should be understood that most of the input images 210a-f are processed (e.g., resized or compressed) which destroys camera model traces but nevertheless the system 10 is able to detect the splicing manipulations present in the input images 210a-f. Accordingly, this indicates that synthetically generated pixels carry a different low level signature that the system 10 can detect and exploit.

The system 10 utilizes an information bottleneck formulation that converts a classical feature modelling problem for identifying camera models into a deep representation learning problem. This is a unique application of information bottleneck to a growing real-world problem with serious consequences. The application of information bottleneck via the system 10 is also unique in that it encourages learning low level noise patterns rather than semantic information which is contrary to the conventional application of information bottleneck. A comparison of the system 10 with the expensive number estimation method (i.e., the MI model) evidences that the computationally efficient approximated solution based on variational information bottleneck of the system 10 outperforms the MI model. As such, the representation learning problem can be solved numerically or approximated via the variational inference where the latter outperforms the former in regards to the task of splicing manipulation localization. Additionally, the system 10 outperforms several state of the art models on a suite of standard test datasets and can detect the signatures of deep generative models (e.g., inpainting GANs).

Figure 11:
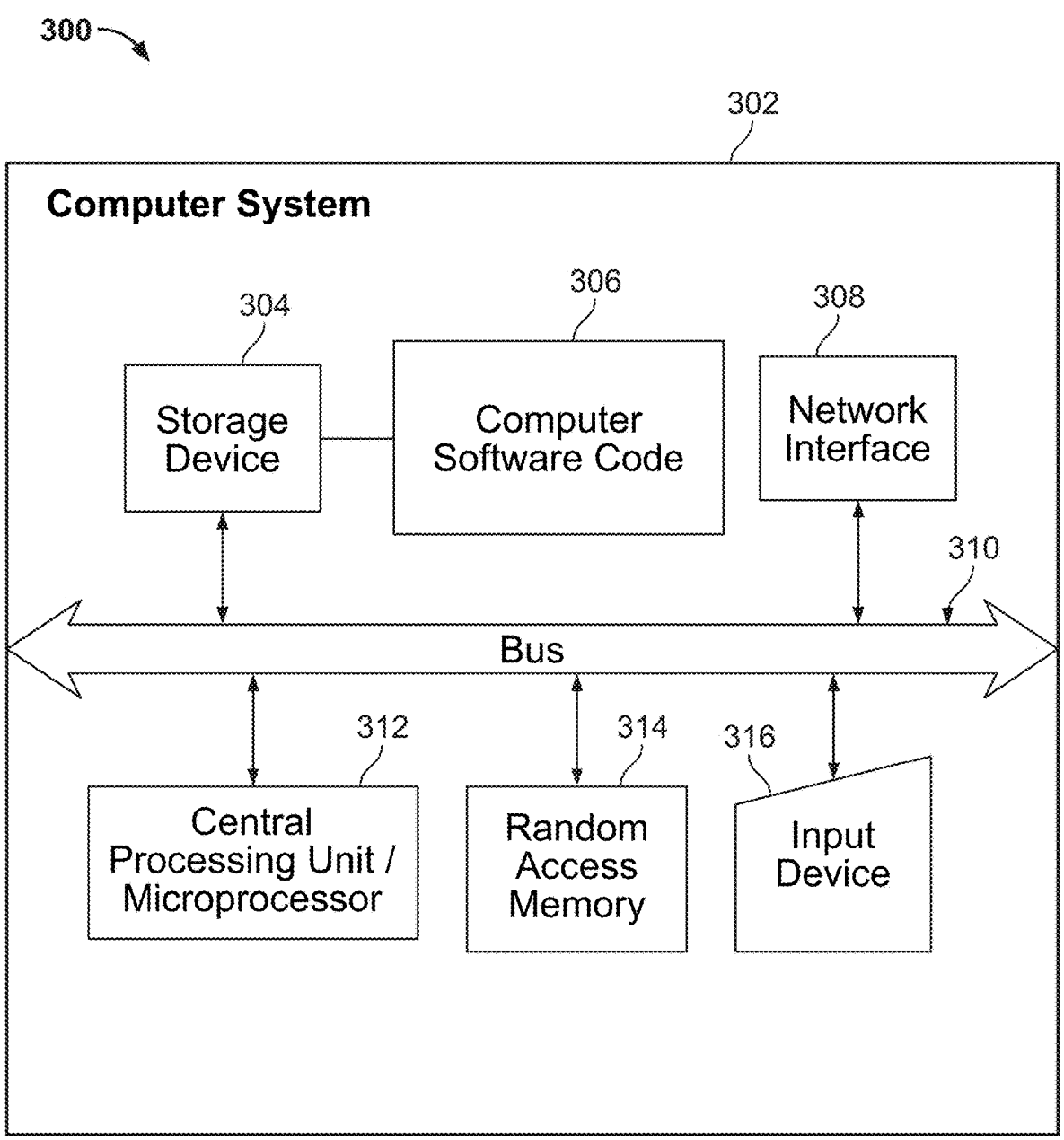
FIG. 11 is a diagram illustrating hardware and software components capable of being utilized to implement the system of the present disclosure.

FIG. 11 is a diagram 300 showing hardware and software components of a computer system 302 (i.e. a server) on which the system 10 of the present disclosure can be implemented. The computer system 302 can include a storage device 304, computer software code 306, a network interface 308, a communications bus 310, a central processing unit (CPU) (microprocessor) 312, a random access memory (RAM) 314, and one or more input devices 316, such as a keyboard, mouse, etc. It is noted that the CPU 312 could be one or more graphics processing units (GPUs), if desired. The server 302 could also include a display (e.g., liquid crystal display (LCD), cathode ray tube (CRT), etc.). The storage device 304 could comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.). The computer system 302 could be a networked computer system, a personal computer, a server, a smart phone, tablet computer etc. It is noted that the server 302 need not be a networked server, and indeed, could be a stand-alone computer system.

The functionality provided by the present disclosure could be provided by computer software code 306, which could be embodied as computer-readable program code stored on the storage device 304 and executed by the CPU 212 using any suitable, high or low level computing language, such as Python, Java, C, C++, C#, .NET, MATLAB, etc. The network interface 308 could include an Ethernet network interface device, a wireless network interface device, or any other suitable device which permits the server 302 to communicate via the network. The CPU 312 could include any suitable single-core or multiple-core microprocessor of any suitable architecture that is capable of implementing and running the computer software code 306 (e.g., Intel processor). The random access memory 314 could include any suitable, high-speed, random access memory typical of most modern computers, such as dynamic RAM (DRAM), etc.

Figure 12:
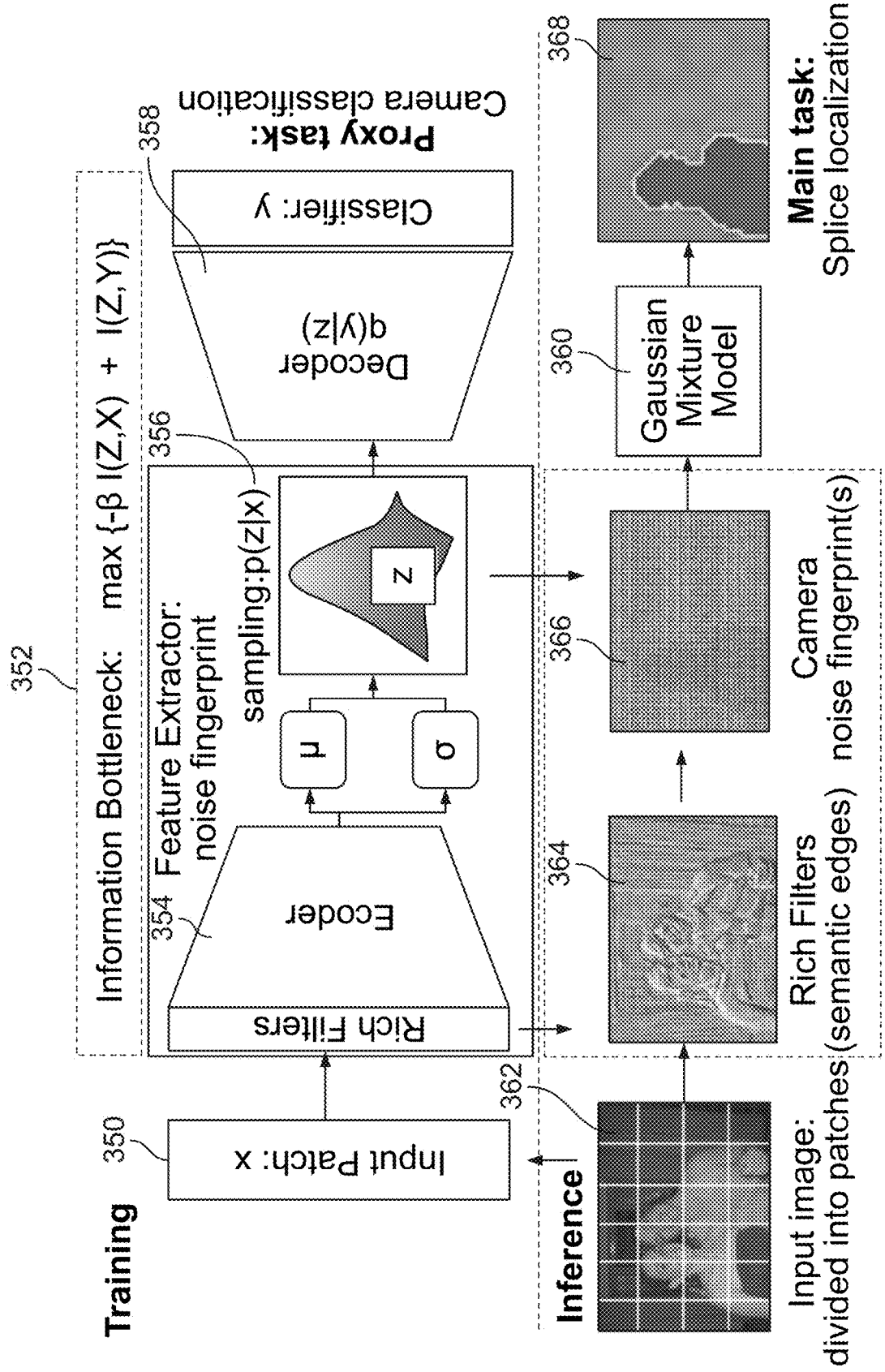
FIG. 12 is a diagram illustrating the neural network 16 of the present disclosure, in greater detail.

FIG. 12 is a diagram illustrating the neural network 16 of FIG. 1 in greater detail. As can be seen, the network takes an input patch 350 from an input image 360, during training of the neural network. The input patch 350 is processed by an encoder 354 having one or more rich filters, which generate semantic edges as can be seen in the image 364. A feature extractor 356 extracts a noise fingerprint using the processes disclosed herein, to produce a camera noise fingerprint shown in image 366. The noise fingerprint is processed by a decoder 358 and associated classifier to perform a proxy task of camera classification. Also, the noise fingerprint is processed by a Gaussian mixture model 360 to perform a main task of splice localization, as illustrated in image 368. The Gaussian mixture model 360 is not a part of the network 16, and is instead a separate model utilized for splice localization. The splice localization shown in image 368 identifies the genuine patches of the image from the forged ones, thereby indicating the forged portions of the image. As can be seen in FIG. 12, the network 16 utilizes the information bottleneck function described herein during the filtration, encoding, feature extraction, sampling, decoding, and classification steps. The information bottleneck function improves over rich filters by suppressing the semantic contents and amplifying the true camera noise fingerprints in the image, thereby enhancing the ability of the system to determined forged portions of an image.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

What is claimed:

1. A machine learning system for localizing image forgery comprising:
    a memory; and
    a processor in communication with the memory, the processor:
        generating a variational information bottleneck function,
        training a neural network with the variational information bottleneck function and a plurality of images of a dataset to learn a low level representation indicative of a statistical signature of a source camera model of each image among the plurality of images, and
        localizing a forgery within an image of the dataset using the trained neural network,
    wherein the processor:
        extracts at least one noise residual pattern from each image among the plurality of images, constructs the neural network based on the extracted at least one noise residual pattern to suppress semantic information from each image among the plurality of images, and
trains the neural network by minimizing the variational information bottleneck function.

2. The system of claim 1, wherein the processor,
determines a range of values of a regularization parameter of the variational information bottleneck function based on an RD curve, and
determines a value of the regularization parameter based on the range.

3. The system of claim 1, wherein the processor localizes the attribute of the image of the dataset by the trained neural network by:
determining a low level representation for juxtaposed patches of the image based on the learned low level representation indicative of the statistical signature of the source camera model of the image, and
segmenting the determined low level representations of the juxtaposed patches.

4. The system of claim 1, wherein the neural network is a 27 layer encoder-decoder based Convolutional Neural Network (CNN) wherein each convolution is followed by batch normalization and a rectified linear unit (ReLU) activation.

5. The system of claim 1, wherein the dataset is a Dresden Image dataset.

6. The system of claim 1, wherein the localized adversarial perturbation of the image is at least one of a splicing or an inpainting manipulation.

7. A method for localizing image forgery by a machine learning system, comprising the steps of:
generating a variational information bottleneck function,
training a neural network with the variational information bottleneck function and a plurality of images of a dataset to learn a low level representation indicative of a statistical signature of a source camera model of each image among the plurality of images,
localizing a forgery within an image of the dataset using the trained neural network,
extracting at least one noise residual pattern from each image among the plurality of images,
constructing the neural network based on the extracted at least one noise residual pattern to suppress semantic information from each image among the plurality of images, and
training the neural network by minimizing the variational information bottleneck function.

8. The method of claim 7, further comprising
determining a range of values of a regularization parameter of the variational information bottleneck function based on an RD curve, and
determining a value of the regularization parameter based on the range.

9. The method of claim 7, further comprising localizing the attribute of the image of the dataset by the trained neural network by;
determining a low level representation for juxtaposed patches of the image based on the learned low level representation indicative of the statistical signature of the source camera model of the image, and
segmenting the determined low level representations of the juxtaposed patches.

10. The method of claim 7, wherein the neural network is a 27 layer encoder-decoder based Convolutional Neural Network (CNN) wherein each convolution is followed by batch normalization and a rectified linear unit (ReLU) activation.

11. The method of claim 7, wherein the localized adversarial perturbation of the image is at least one of a splicing or inpainting manipulation.

12. A non-transitory computer readable medium having instructions stored thereon for localizing image forgery by a machine learning system which, when executed by a processor, causes the processor to carry out the steps of:
generating a variational information bottleneck function,
training a neural network with the variational information bottleneck function and a plurality of images of a dataset to learn a low level representation indicative of a statistical signature of a source camera model of each image among the plurality of images,
localizing a forgery within an image of the dataset using the trained neural network,
extracting at least one noise residual pattern from each image among the plurality of images,
constructing the neural network based on the extracted at least one noise residual pattern to suppress semantic information from each image among the plurality of images, and
training the neural network by minimizing the variational information bottleneck function.

13. The non-transitory computer readable medium of claim 12, the processor further carrying out the steps of:
determining a range of values of a regularization parameter of the variational information bottleneck function based on an RD curve, and
determining a value of the regularization parameter based on the range.

14. The non-transitory computer readable medium of claim 12, the processor localizing the attribute of the image of the dataset by the trained neural network by carrying out the steps of:
determining a low level representation for juxtaposed patches of the image based on the learned low level representation indicative of the statistical signature of the source camera model of the image, and
segmenting the determined low level representations of the juxtaposed patches.

15. The non-transitory computer readable medium of claim 12, wherein the neural network is a 27 layer encoder-decoder based Convolutional Neural Network (CNN) wherein each convolution is followed by batch normalization and a rectified linear unit (ReLU) activation.

16. The non-transitory computer readable medium of claim 12, wherein the localized adversarial perturbation of the image is at least one of a splicing or an inpainting manipulation.

17. A machine learning system for localizing image forgery comprising:
a memory; and
a processor in communication with the memory, the processor:
generating a variational information bottleneck function,
training a neural network with the variational information bottleneck function and a plurality of images of a dataset to learn a low level representation indicative of a statistical signature of a source camera model of each image among the plurality of images, and
localizing a forgery within an image of the dataset using the trained neural network, wherein the processor:
localizes the attribute of the image of the dataset by the trained neural network by:
determining a low level representation for juxtaposed patches of the image based on the learned low level representation indicative of the statistical signature of the source camera model of the image, and
segmenting the determined low level representations of the juxtaposed patches.

18. The system of claim 17, wherein the dataset is a Dresden Image dataset.

19. The system of claim 17, wherein the localized adversarial perturbation of the image is at least one of a splicing or an inpainting manipulation.

20. A method for localizing image forgery by a machine learning system, comprising the steps of:
generating a variational information bottleneck function,
training a neural network with the variational information bottleneck function and a plurality of images of a dataset to learn a low level representation indicative of a statistical signature of a source camera model of each image among the plurality of images,
localizing a forgery within an image of the dataset using the trained neural network,
determining a low level representation for juxtaposed patches of the image based on the learned low level representation indicative of the statistical signature of the source camera model of the image, and
segmenting the determined low level representations of the juxtaposed patches.

21. The method of claim 20, wherein the neural network is a 27 layer encoder-decoder based Convolutional Neural Network (CNN) wherein each convolution is followed by batch normalization and a rectified linear unit (ReLU) activation.

22. The method of claim 20, wherein the localized adversarial perturbation of the image is at least one of a splicing or inpainting manipulation.

23. A non-transitory computer readable medium having instructions stored thereon for localizing image forgery by a machine learning system which, when executed by a processor, causes the processor to carry out the steps of:
generating a variational information bottleneck function,
training a neural network with the variational information bottleneck function and a plurality of images of a dataset to learn a low level representation indicative of a statistical signature of a source camera model of each image among the plurality of images,
localizing a forgery within an image of the dataset using the trained neural network,
determining a low level representation for juxtaposed patches of the image based on the learned low level representation indicative of the statistical signature of the source camera model of the image, and
segmenting the determined low level representations of the juxtaposed patches.

24. The non-transitory computer readable medium of claim 23, wherein the neural network is a 27 layer encoder-decoder based Convolutional Neural Network (CNN) wherein each convolution is followed by batch normalization and a rectified linear unit (ReLU) activation.

25. The non-transitory computer readable medium of claim 23, wherein the localized adversarial perturbation of the image is at least one of a splicing or an inpainting manipulation.

* * * * *